(12) United States Patent
Okuno et al.

(10) Patent No.: US 7,035,418 B1
(45) Date of Patent: Apr. 25, 2006

(54) METHOD AND APPARATUS FOR DETERMINING SOUND SOURCE

(75) Inventors: Hiroshi Okuno, Tokyo (JP); Hiroaki Kitano, Saitama (JP); Yukiko Nakagawa, Kanagawa (JP)

(73) Assignee: Japan Science and Technology Agency, Saitama (JP)

( * ) Notice: Subject to any disclaimer, the term of this patent is extended or adjusted under 35 U.S.C. 154(b) by 991 days.

(21) Appl. No.: 09/926,673

(22) PCT Filed: Jun. 7, 2000

(86) PCT No.: PCT/JP00/03695

§ 371 (c)(1),
(2), (4) Date: Nov. 30, 2001

(87) PCT Pub. No.: WO00/77537

PCT Pub. Date: Dec. 21, 2000

(30) Foreign Application Priority Data

Jun. 11, 1999 (JP) ............................... 11-165182

(51) Int. Cl.
*H04R 5/02* (2006.01)
(52) U.S. Cl. ............... 381/310; 381/119; 381/92; 381/17; 704/278; 704/224; 704/225; 348/14.16; 348/14.05; 348/169; 382/115
(58) Field of Classification Search .............. 704/225, 704/224, 278; 381/310, 119, 92, 17; 348/14.1, 348/169, 14.05, 14.16; 345/581; 382/115
See application file for complete search history.

(56) References Cited

U.S. PATENT DOCUMENTS

| | | | | |
|---|---|---|---|---|
| 5,367,506 A | * | 11/1994 | Inanaga et al. ............... 369/4 |
| 5,402,499 A | * | 3/1995 | Robison et al. ............. 381/119 |
| 5,596,645 A | * | 1/1997 | Fujimori ....................... 381/17 |
| 5,786,846 A | | 7/1998 | Hiroaki et al. |
| 5,940,118 A | * | 8/1999 | Van Schyndel .......... 348/14.05 |
| 6,005,610 A | * | 12/1999 | Pingali ........................ 348/169 |
| 6,021,206 A | * | 2/2000 | McGrath .................... 381/310 |
| 6,072,522 A | * | 6/2000 | Ippolito et al. ............ 348/14.1 |
| 6,130,659 A | * | 10/2000 | Kim et al. .................. 345/581 |
| 6,192,134 B1 | * | 2/2001 | White et al. .................. 381/92 |

(Continued)

FOREIGN PATENT DOCUMENTS

EP  0 689 356  12/1995

(Continued)

OTHER PUBLICATIONS

Nakatani T. et al., "Harmonic sound stream segregation using localization and its application to speech stream segregation", Speech Communication, Elsevier Science Publishers, Amsterddam, NL, vol. 27, No. 3-4, Apr. 1999, pp. 209-222.

*Primary Examiner*—Vijay B. Chawan
(74) *Attorney, Agent, or Firm*—Westerman, Hattori Daniels & Adrian, LLP

(57) ABSTRACT

Provided in accordance with the invention are a sound source identifying apparatus and method whereby objects as sound sources can be determined as to their locations with higher accuracy by using sound information and image information thereof and are separated from mixed sounds with certainty by using position information thereof. The sound source identifying apparatus (10) is constructed to include a sound collecting part; an imaging part; a sensing part; an image processing part; a sound processing part; and a control part.

15 Claims, 8 Drawing Sheets

U.S. PATENT DOCUMENTS 6,311,155 B1 * 10/2001 Vaudrey et al. ............. 704/225
6,317,501 B1    11/2001 Matsuo
6,526,158 B1 *  2/2003 Goldberg .................... 382/115

FOREIGN PATENT DOCUMENTS

| GB | 2 309 105 A * | 7/1997 |
|----|---------------|--------|
| JP | 5-244587 | 9/1993 |
| JP | 7-39000 | 2/1995 |
| JP | 8-251561 | 9/1996 |
| JP | 8-286680 | 11/1996 |
| JP | 9-33330 | 2/1997 |
| JP | 10-51889 | 2/1998 |
| JP | 10-313497 | 11/1998 |
| JP | 11 018194 | 1/1999 |
| JP | 11-041577 | 2/1999 |
| WO | WO 97/43856 | 11/1997 |

* cited by examiner (A)

(B)

(C)

Direction in which a Sound Source is Located

Frame No. 7

Frame No. 51

Frame No. 78

Frame No. 158

METHOD AND APPARATUS FOR DETERMINING SOUND SOURCE

TECHNICAL FIELD

The present invention relates to a sound source identifying apparatus and method for identifying various sounds individually based on image information and sound information derived from a plurality of such sound sources.

BACKGROUND ART

Researches have so far been undertaken to separate from mixed sounds a particular sound such as a voice or a music sound included in the mixed sounds. For example, a sound recognition system has been known that assumes its input sound to be a speech or voices. And, insofar as image or image processing is concerned, a system has been known which in educing an object assumes its color, shape and/or movement to characterize it.

There has so far been no sound recognition system, however, that associates sound recognition with image processing. On the other hand, the system assuming a speech or voices is only effectuated when a microphone is near the mouth or where there is no other sound source.

Further, while there is a system proposed to separate based on a harmonic structure, a particular sound signal from those from a plurality of sound sources and then to find the direction in which its sound source is located, the accuracy with which the direction of the sound source can be found thereby is as rough as ±10°, and it is not possible to separate the sound source if it lies close to an adjacent sound source or sources.

There has also been proposed a method that uses a plurality of sound collecting microphones the same in number as sound source and, based on sound information from the various sound collecting microphones, to identify a particular sound source. While this method is designed to identify the intensity of a sound and the location of its source, its frequency information comes to spread about the axis defining the direction in which the sound source is located, thereby making it difficult to finely identify the sound source. Further, while this method makes it possible to increase the rate of recognition of a sound source, the requirement for sound collecting microphones the same in number as sound sources existing independently of one another makes the method costly.

Aimed to obviate the difficulties entailed in the prior art as described above, the present invention has for its first object to provide a sound source identifying apparatus that is capable of identifying an object as a source of a sound in mixed sounds in terms of its location with greater accuracy by using both information as to the sound and information as to the sound source as an image thereof and using information as to that position to separate the sound from the mixed sounds with due accuracy.

The present invention further has for its second object to provide a sound source identifying method that is capable of identifying an object as a source of a sound in mixed sounds in terms of its location with greater accuracy by using both information as to the sound and information as to the sound source as an image thereof and using information as to that position to separate the sound from the mixed sounds with due accuracy.

DISCLOSURE OF THE INVENTION

In order to achieve the first object mentioned above, there is provided in accordance with the present invention a sound source identifying apparatus, which apparatus comprises: a sound collecting means for capturing sounds from a plurality of sound sources with a pair of sound collecting microphones juxtaposed with each other across a preselected spacing and opposed to the sound sources and for processing the captured sounds; either or both of an imaging means and a sensing means, the imaging means being adapted to consecutively image objects that can be the said sound sources, the said sensing means being for sensing the said objects possibly being the said sources; an image processing means for deriving information as to locations of the said objects possibly being the said sound sources, from either or both of image pictures imaged by the said imaging means and directional information of the said objects sensed by the said sensing means; a sound processing means for localizing the positions of the said sound sources based on sound information of the said sounds captured by the said sound collecting means and position information derived by the said image processing means; and a control means for controlling operations of the said sound collecting means, the said imaging means and/or the said sensing means, the said image processing means, and the said sound processing means.

Further, in addition to the construction mentioned above, the said sound processing means preferably includes directional filters, each of which is adapted to extract sound information at a particular time instant selectively.

The said sound processing means preferably has a function to derive information as to rough directions in which said objects possibly being the sound sources are located.

The said sensing means preferably is adapted to sense the said objects possibly being the said sound sources in response to magnetism thereof or an infrared ray therefrom.

Preferably, the said objects possibly being the said sound sources have each a material carrying magnetism attached thereto.

Having a construction as mentioned above, the sound source identifying apparatus of the present invention in localizing the locations of sound sources according to the sound information acquired from the sound collecting microphones is designed to narrow the directions of the sound sources with reference to the position information based on the information as to image pictures imaged by the imaging means and the information as to the directions acquired by the sensing means.

Accordingly, the sound source identifying apparatus of the present invention is made able to specify the each object that can be the sound sources by using dynamic image pictures and directional information of the objects and at the same time to individually separate the sound sources reliably by using their position information and sound information.

In order to achieve the second object mentioned above, there is also provided in accordance with the present invention a sound source identifying method, which comprises: a first step of capturing sounds from a plurality of sound sources with a pair of sound collecting microphones juxtaposed with each other across a spacing and opposed to the sound sources and processing the captured sounds, in a sound collecting means; a second step, conducted concurrently with the first step, of consecutively imaging objects that can be the said sound sources and/or sensing directions in which the said objects are located; a third step of deriving information as to locations of the said objects possibly being the said sound sources, from either or both of image pictures imaged, and the directions sensed, in the second step; and a fourth step of localizing locations of the said sound sources based on sound information of the sounds collected in the first step and position information derived in the third step.

The sound source identifying method according to the present invention preferably further includes a fifth step of deriving information as to rough locations of the said sound sources only from the sound information of the said sounds collected in the said first step, wherein the said third step includes narrowing in advance directions of the said sound sources based on the rough position information derived in the said fifth step, thereby deriving the said position information of the said objects possibly being the said sound sources.

Preferably in the sound source identifying method according to the present invention, the said fifth step roughly derives the directions of the said sound sources from a difference between phases and a difference between intensities of each of the said sounds acquired by the said sound collecting microphones.

Preferably in the sound source identifying method according to the present invention, the said position information of the said objects possibly being the said sound sources is derived in the said third step on the basis of either or both of a color and a shape of a said object.

In the sound source identifying method according to the present invention, the said fourth step preferably localizes the locations of the said sound sources by selecting particular preset directional filters in response to the position information derived in the said third step.

Preferably in the sound source identifying method according to the present invention, the locations of the said sound sources are localized in the said fourth or fifth step on the basis of a signal in each of frequency bands arbitrarily divided into based on the sound information obtained in the said first step.

Preferably in the sound source identifying method according to the present invention, the said position information of a said object possibly being a said sound source is derived from a movement of the said object.

Preferably in the sound source identifying method according to the present invention, a said direction is sensed in response to magnetism or an infrared ray.

Organized as mentioned above, the sound source identifying method according to the present invention permits not only sound information of a plurality of sound sources to be derived from a sound collecting means made of the two sound collecting microphones opposed to the sound sources, but also image information of these sound sources to be derived from image pictures thereof imaged by an imaging means. Further, sensing the directions of the sound sources by magnetism or an infrared ray gives rise to direction sensing information. And, when the sound processing means is localizing the locations of the sound sources based on sound information, e.g., on the basis of a difference between phases and a difference between intensities in sound information acquired by the sound collecting microphones for each of the sound sources, the direction of each of the sound sources is narrowed with reference to position information derived for each of objects possibly being the sound sources by an image processing means, e.g., from its color, shape and/or movement based on either or both of the direction sensing information and the image information derived from the imaging means, thereby permitting the sound sources to be localized as to their locations on the basis of signals in various frequency bands, e.g., harmonic structures. Consequently, the method makes it unnecessary to process the sound information omnidirectionally or over all the directions in identifying the sound sources, makes it possible to identify the sound source with greater certainty, makes a lesser amount of processable information sufficient and makes it possible to reduce the time for processing.

In this case, the ability to identify three or more sound sources with two sound collecting microphones in the sound collecting means makes it possible to effect accurate identification of the locations of sound sources in simple construction.

Also, if the method is so conducted as set forth above that the fifth step is included of deriving information as to rough locations of the sound sources only from the sound information of the sounds collected in the first step and that the third step includes narrowing in advance directions of the sound sources based on the rough position information derived in the fifth step, thereby deriving the position information of the objects possibly being the sound sources, then there results a reduction in the amount of information for processing in deriving the position information of the objects possibly being the sound sources based on the image information in the third step, which simplifies the processing.

If the method is so conducted as set forth above that the fourth step localizes the locations of the sound sources by selecting particular preset directional filters in response to the position information derived in the third step to extract sound information from each of the sound sources, having each of the directional filters preset for extracting sound information from each of the sound sources located in the corresponding direction permits the processing to localize the locations of all the sound sources to go on smoothly.

BRIEF DESCRIPTION OF THE DRAWINGS

The present invention will better be understood from the following detailed description and the drawings attached hereto showing certain illustrative forms of embodiment of the present invention. In this connection, it should be noted that such forms of embodiment illustrated in the accompanying drawings hereof are intended in no way to limit the present invention but to facilitate an explanation and understanding thereof.

In the drawings.

BEST MODES FOR CARRYING OUT THE INVENTION

Figure 1:
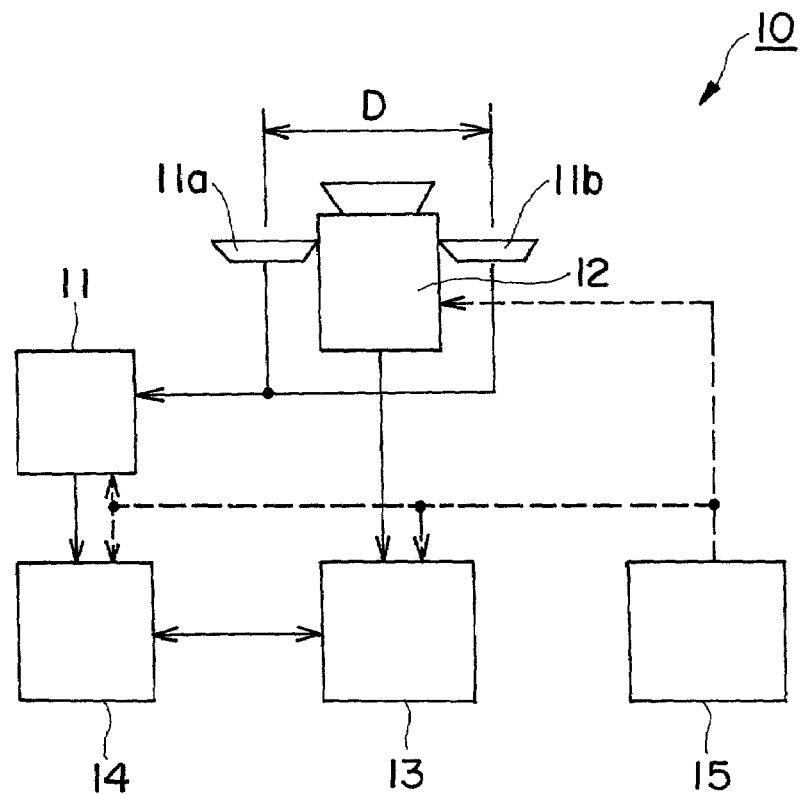
FIG. 1 is a diagrammatic view illustrating the makeup of a first form of embodiment of the sound source identifying apparatus according to the present invention.

Hereinafter, the present invention for a sound source identifying apparatus and method will be described in detail with respect to presently best forms of embodiments thereof illustrated in the drawing figures.

FIG. 1 shows a form of embodiment of the sound source identifying apparatus according to the present invention.

Referring to FIG. 1, the sound source identifying apparatus 10 includes a sound collecting means 11, an imaging means 12, an image processing means 13, a sound processing means 14 and a control means 15.

The sound collecting means 11 is designed to capture sounds from a plurality of sound sources, for example, three talkers, with a pair of sound collecting microphones 11a and 11b juxtaposed with each other across a preselected spacing D as indicated in FIG. 1 and opposed to the sound sources and to process the captured sounds. While the disposition of these sound collecting microphones may be set in any suitable manner, in the example shown they are provided at opposite sides of the imaging means 12, namely at its right hand and left hand sides.

Figure 2:
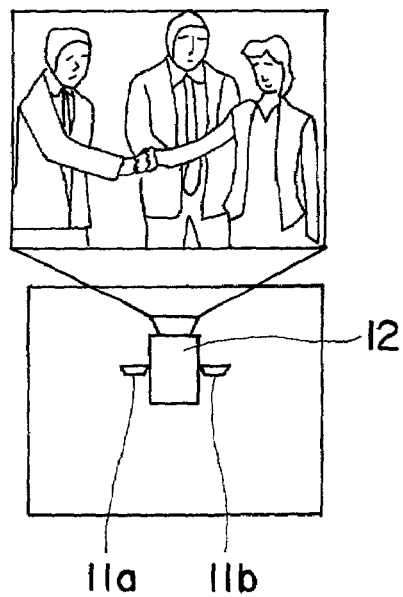
FIG. 2 is a diagrammatic view of an exemplary image picture taken or imaged by an imaging means in the sound source identifying apparatus shown in FIG. 1.

The imaging means 12 is constituted, for example, of a CCD (charge coupled device) camera and is designed as shown in FIG. 2 to make image pictures of a plurality of sound sources, e.g., three talkers A, B, and C, consecutively.

The image processing means 13 is designed to derive information as to the locations of objects that can be sound sources, in images taken by the imaging means 12, and based on their color, shape or movement. It should be noted here that the term "movement" is intended to include vibrations.

Figure 3:
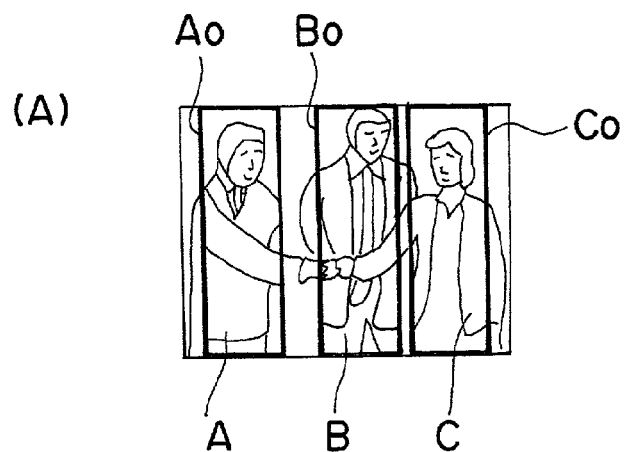
FIG. 3 is an explanatory view for the image picture in the sound source identifying apparatus of FIG. 1 in which (A) shows rough directions A0, B0 and C0 of sound sources determined by a sound processing means, (B) shows frames A1, B1 and C1 of objects possibly as the sound sources determined by an image processing means, and (C) shows pieces of position information A3, B3 and C3 of the objects possibly as the sound sources determined by the image processing means.
Figure 3:
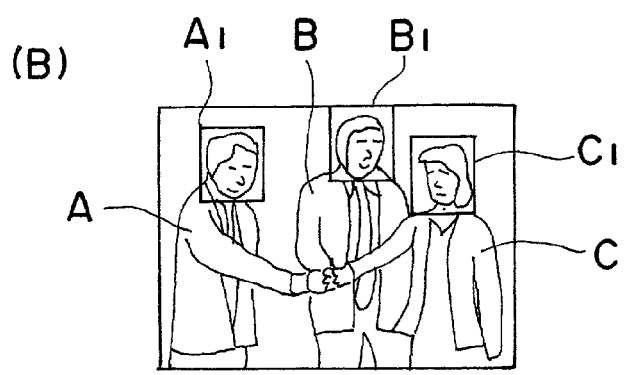
Figure 3:
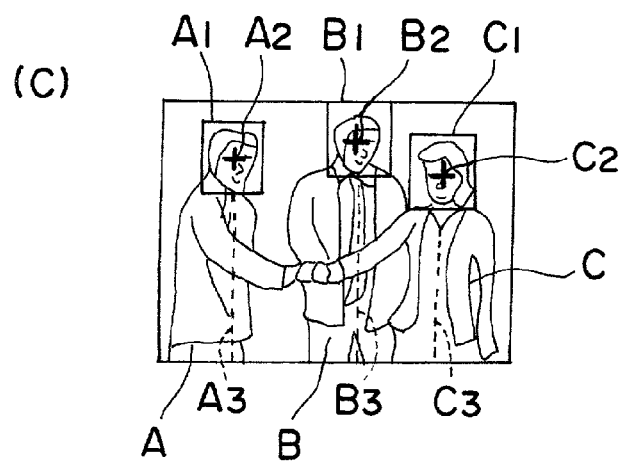

In this case, the image processing means 13 sets up in and for the image picture taken by the imaging means 12, frames A1, B1 and C1 for the three talkers A, B and C according to the color (i.e., the color of the skin of a human being) and height as shown in FIG. 3(B). Then, as shown in FIG. 3(C) the image processing means 13 selects center points A2, B2 and C2 of these frames A1, B1 and C1 (indicated in FIG. 3 by the + marks) as the respective locations of the objects to be possibly sound sources and takes their respective horizontal coordinates A3, B3 and C3 as information of these positions.

At this point, it should be noted that the reason why the words "objects" "that can be", "possibly being" or "possibly as" "sound sources" are used here is that it has not necessarily be clear as yet from image recognition alone if they are indeed sound sources or not.

Preferably, in order to simplify the above image processing, the image processing means 13 prior thereto should have rough directions A0, B0 and C0 of these sound sources (see FIG. 3(A)) entered therein that are determined by the sound processing means 14 to be described in detail below. Thus, having narrowed the respective regions of image processing of the sound sources into the rough directions A0, B0 and C0, the image processing means 13 derives information A3, B3 and C3 as to the respective locations as mentioned above of the objects that can be the sound sources by effecting the image processing within the narrowed regions of the rough directions A0, B0 and C0.

The sound processing means 14 is designed to localize the locations of the sound sources based, for example, on the sound information derived from the microphones in the sound collecting means 11 and the position information A3, B3 and C3 derived by the image processing means 13.

In the identification of the positions of the sound sources, the sound information may be based on a difference in phase and a difference in intensity between two pieces of sound information received by the right hand side and left hand side sound collecting microphones 11a and 11b, respectively.

Figure 4:
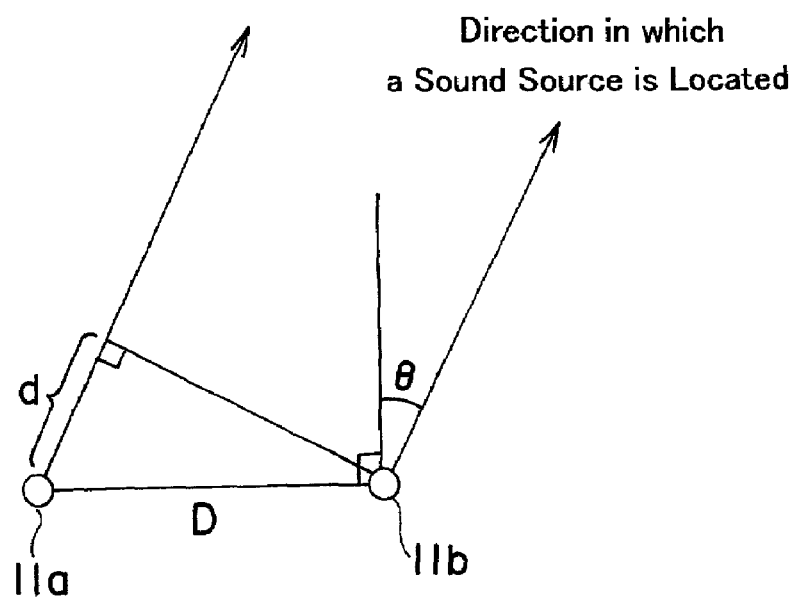
FIG. 4 is an explanatory view illustrating a difference in distance between a sound source and two sound collecting microphones included in a sound collecting means in the sound source identifying apparatus of FIG. 1.
Figure 5:
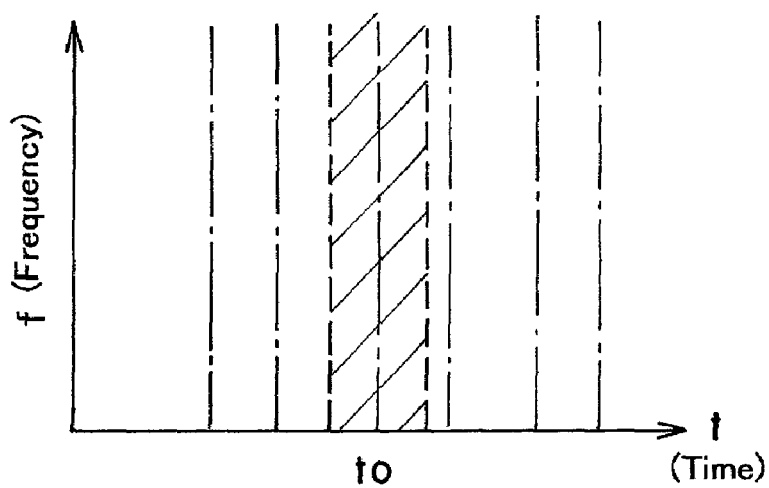
FIG. 5 is a graph illustrating an operation of a directional filter included in the sound processing means in the sound source identifying apparatus of FIG. 1.

Thus in deriving sound information from a given sound source, as shown in FIG. 4 use may be made here of the fact that changing as a function of the direction $\theta$ in which a sound from the sound source propagates arriving at the two sound collecting microphones 11a and 11b ($\theta$=0 when the sound source is in the front, a minus when it is in the left and a plus when it is in the right of them), a difference d between distances from the sound source to the two microphones 11a and 11b (expressed by equation: d=D sin $\theta$) causes the sound to vary in phase and also by damping to vary in intensity as it arrives them.

Further, because the location of the sound source is not clear as yet, the sound processing means 14 here effects processing as mentioned above over the entire ranges of angles: $-90$ degrees$\leq\theta\leq+90$ degrees. In this case, the processing operation may be lightened by, for example, processing every angular interval, e.g., 5 degrees of $\theta$.

The sound processing means 15 first selects or determines rough directions A0, B0 and C0 of the sound sources based on sound information left and right from the sound collecting means 11. This follows the conventional sound source identifying technique yielding an accuracy of $\pm 10$ degrees.

And, the sound processing means 14 outputs these rough directions A0, B0 and C0 for entry into the image processing means 13.

Further, the sound processing means 14 with reference to the position information A3, B3 and C3 entered therein from the image processing means 13 localizes the locations of the sound sources based again on the sound information narrowed into the ranges of the position information A3, B3 and C3, namely in the ranges of the position information A3, B3 and C3.

In this case, the sound processing means 14 localizes the locations of the sound sources by making an appropriate choice of what are called directional filters for the sound sources A, B and C, respectively.

Here, prepared so as to selectively extract sound information only at a particular time t0 such directional filters are stored as in a control table for the directions of the sound sources in an auxiliary storage means (not shown) in the control means 15, and are identified and selected as appropriate by the sound processing means 14 from the auxiliary storage means based on the position information A3, B3 and C3 from the image processing means 13.

Figure 6:
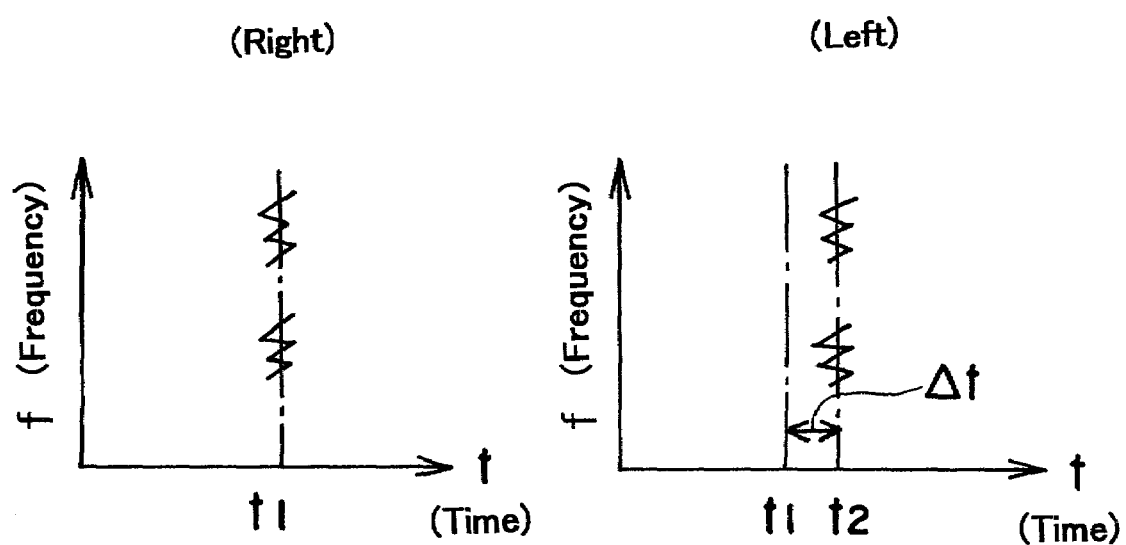
FIG. 6 is a graph illustrating the extraction of two pieces of sound information for a sound from a single sound source performed in the sound processing means in the sound source identifying apparatus of FIG. 1.

This permits pieces of sound information emitted concurrently from sound sources and collected by the sound collecting microphones 11a and 11b to be acquired when as shown in FIG. 6 a piece of sound information is given in the right hand side at time t1 and then another piece of information in the left hand side is taken out at time t2 that is after a delay time Δt following it (t2=t1+Δt). Note, however, that Δt can yet be negative.

Figure 7:
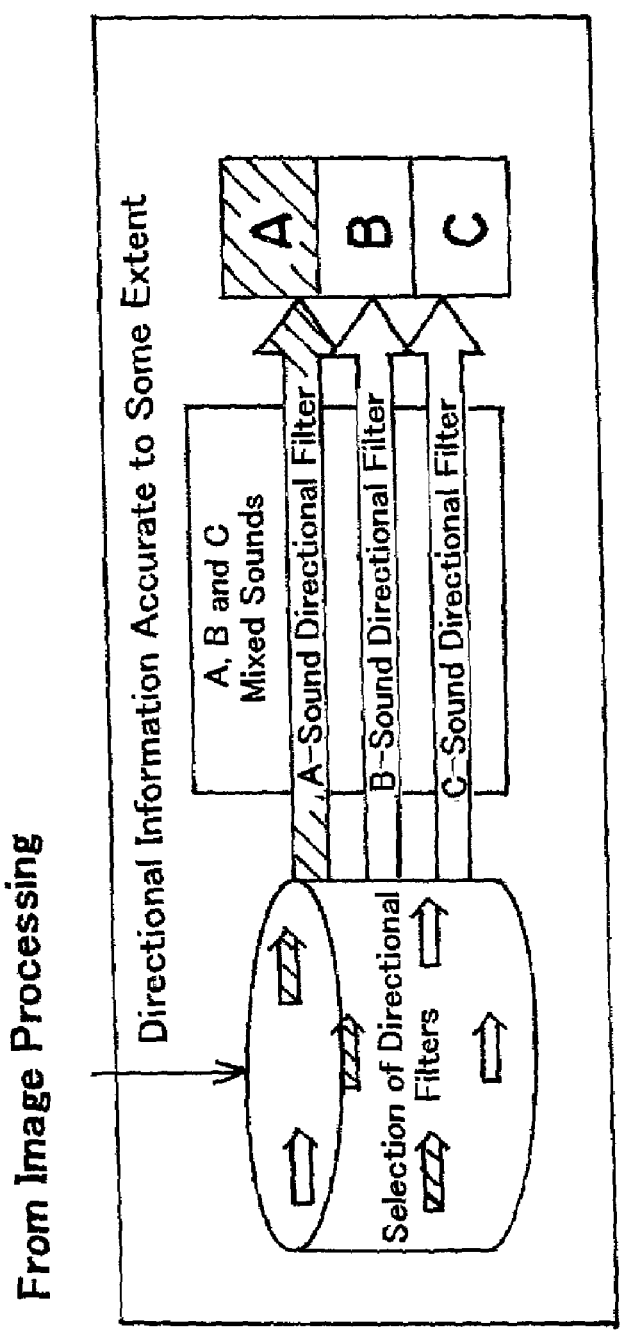
FIG. 7 is an explanatory view illustrating the extraction of sound information from each sound source performed by the directional filter in the sound processing means in the sound source identifying apparatus of FIG. 1.

In this way, the selection of a particular directional filters by the sound processing means 14 with respect to each of the sound sources A, B and C possessing a directional information that is accurate to a certain extent enables their respective pieces of sound information to be obtained from the mixture of sounds as shown in FIG. 7.

It should be noted at this point that narrowing the respective ranges of the directions of the sound sources by the pieces of position information A3, B3 and C3 makes it unnecessary for the sound processing means 14 to conduct processing over the entire range of angles for θ (−90 degrees≦θ≦+90 degrees) and makes it sufficient for the same to process a certain narrowed range of angles about the pieces of position information A3, B3 and C3.

The control means 15 that may, for example, be comprised of a computer is designed to control the operations of the sound collecting means 11, the imaging means 12, the image processing means 13 and the sound processing means 14. The control means 15 as mentioned above has the directional filters stored as preset in the auxiliary storage means (not shown) therein.

Constructed as mentioned above, the sound source identifying apparatus 10 according to the present form of embodiment operates as described below, in accordance with the flow chart shown in FIG. 8.

Figure 8:
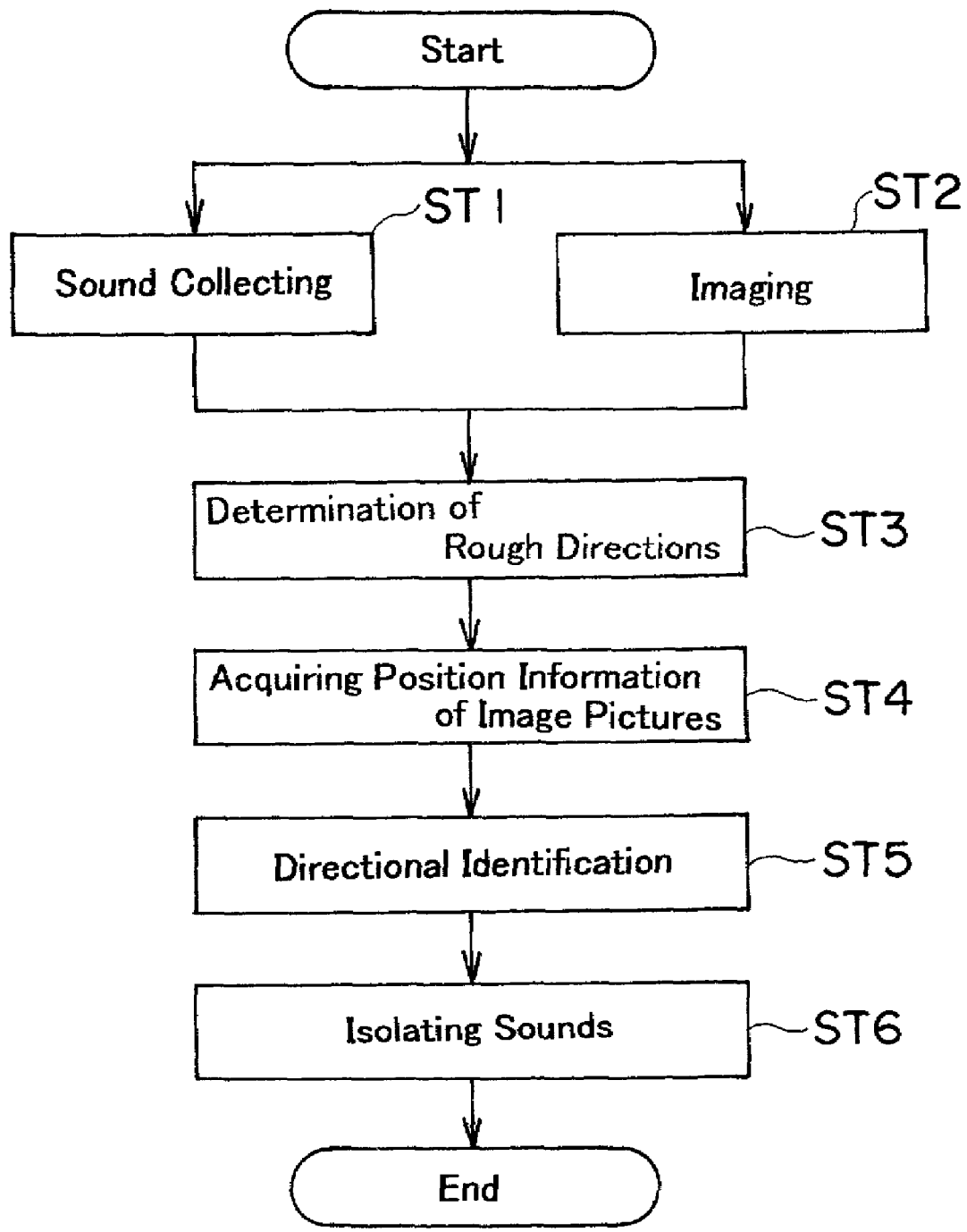
FIG. 8 is a flow chart illustrating a method of operating the sound source identifying apparatus of FIG. 1.

Referring to FIG. 8, in step ST1 the control means 15 acts on the sound collecting means 11 to cause each of the sound collecting microphones 11a and 11b to collect sound from sound sources A, B and C, while in the mean time the control means 15 also acts on the imaging means 12 to cause it to image the sound sources consecutively in step ST2.

Next, in step ST3 the control means 15 acts on the sound processing means 14 to cause it to select or determine rough directions A0, B0 and C0 in which the sound sources are located, respectively (see FIG. 3(A)), based on pieces of sound information for a difference between the phases and a difference between the intensities that the sound from each of the sound sources has as it is collected by the two microphones, respectively, in the sound collecting means 11. Then, all the harmonic structures in which any phase difference exists are examined to roughly separate the sound sources from the mixture sound. As a postscript, a harmonic structure is made a standard as an example of the signal for each of frequency bands arbitrarily divided into.

Subsequently, in step ST4 the control means 15 acts on the image processing means 13 to cause it to select or determine position information A3, B3 and C3 (see FIG. 3(C)) as to objects as possible sound sources according to an color and/or shape thereof in image pictures received from the imaging means 12, and within the ranges of the rough directions received from the sound processing means 14.

Thereafter, in step ST5 the control means 15 acts on the sound processing means 14 to cause it to localize the locations of the sound sources A, B and C according to the sound information received from the sound collecting means within a given range of angles for the position information A3, B3 and C3 received from the image processing means 14.

Finally, in step ST6 the sound processing means 14 selects a particular directional filter to selectively extract sound information of a same sound from a same sound source and with a particular time delay. Without processing sound information of another, erroneous harmonic structure, this reduces the error and increases the sound source separation efficiency.

In this manner, it will be seen that the sound source identifying apparatus 10 according to the illustrated form of embodiment of the present invention in which in identifying a sound source, the sound processing means 14 is made to operate based not only on sound information received from the sound collecting means 11 but also on an image picture imaged by the imaging means 12, thus while referring to position information A3, B3, C3 of an object that can be the sound source, has the ability to identify a sound source with an accuracy increased from that of around ±10 degrees attainable with the conventional system in which only sound information from the sound collecting means 11 is based on.

It is further seen that enhancing the accuracy of localizing the location of a sound source by refining sound information that beforehand roughly separates the sound source from another sound source with position information derived from image information makes its identification reliable even if they are close to each other.

Figure 9:
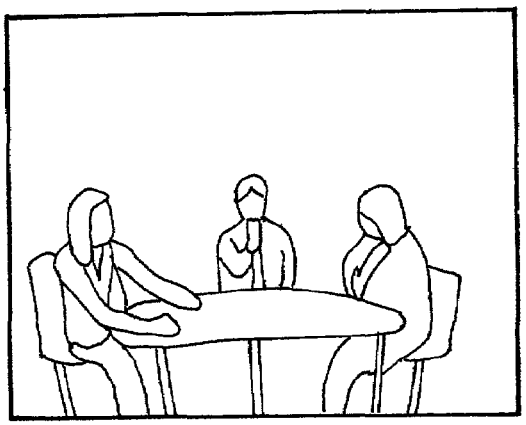
FIG. 9 is a pictorial diagram illustrating a portion of consecutive image pictures taken by the imaging means in the sound source identifying apparatus of FIG. 1.
Figure 9:
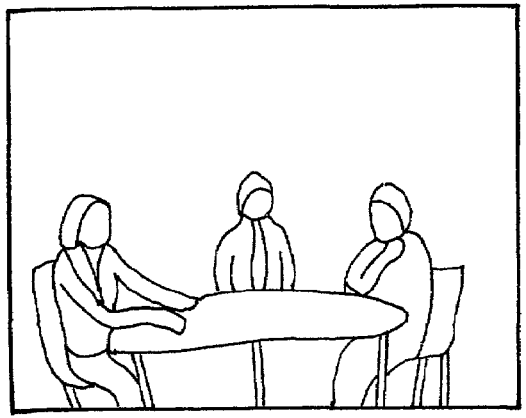
Figure 9:
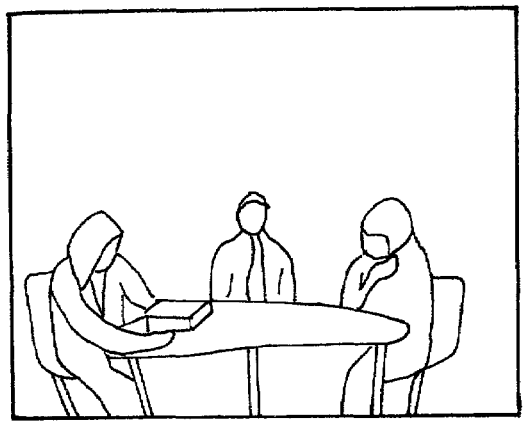
Figure 9:
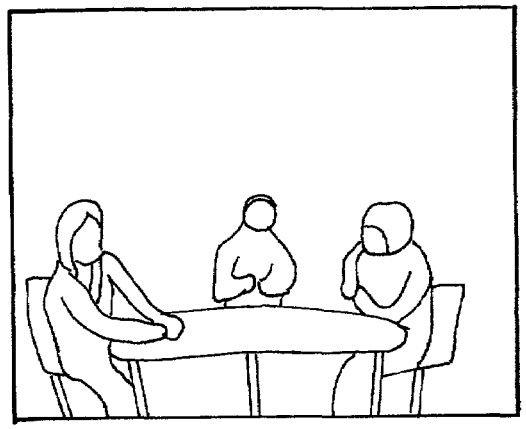

More specifically, if three talkers as sound sources are imaged by the imaging means 12 consecutively, for example image pictures are obtainable as shown in FIG. 9 in which they are of the $7^{th}$, $51^{st}$, $78^{th}$ and $158^{th}$ frames of all the pictures consecutively imaged.

Figure 10:
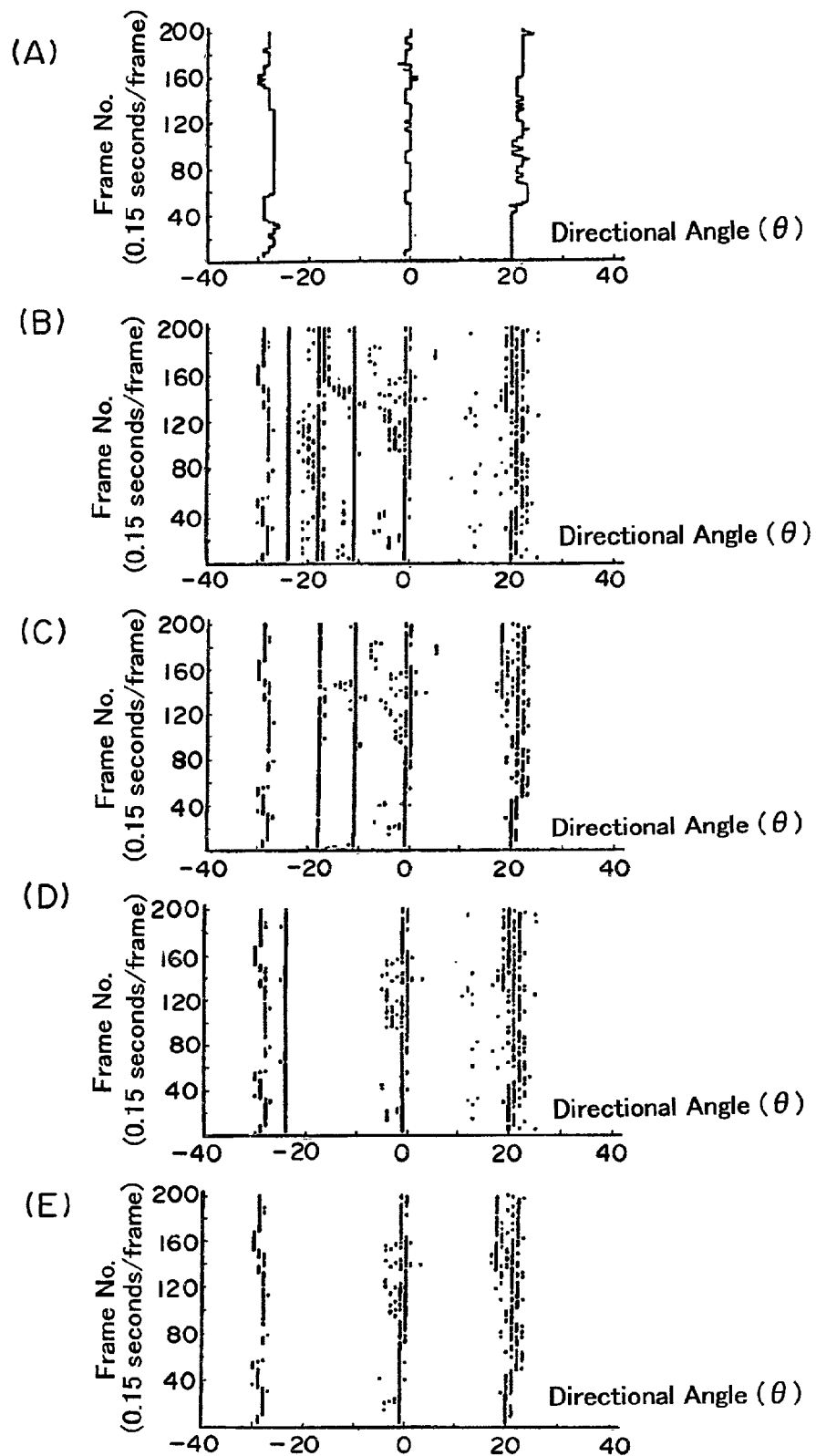
FIG. 10 is a graph illustrating information as to positions determined by the image processing means on a variety of bases of an object that can be a sound source in the sound source identifying apparatus of FIG. 1.

Here, these talkers' faces are actually lying as shown in FIG. 10(A) from which it is apparent that the talkers are positioned at around −30 degrees, 0 degree and +20 degrees of directional angle, respectively.

Then, if determination is made to locate these objects possibly as the sound sources by the image processing means 13 processing the images only on the basis of the color, it is seen as shown in the graph of FIG. 10(B) that various other objects in the image pictures are recognized, too, as sound sources by mistake. If, however, both the color and height were based on in the image processing, the mistake is seen to decrease as shown in the graph of FIG. 10(C).

Further, if the image processing means 13 is caused to process the images based on the color only while referring to the rough directions A0, B0 and C0 received from the sound processing means 14, the mistake is seen to decrease still more as shown in the graph of FIG. 10(D).

Yet further, if the image processing means 13 is caused to process the images based on both the color and height while referring to the rough directions A0, B0 and C0 received from the sound processing means 14, it is apparent that the sound sources can be determined as their position information with an accuracy that compares favorably with the actual face position shown in FIG. 10(A), that is with considerable certainty.

While in the example mentioned above the horizontal coordinates A3, B3 and C3 of the center positions A2, B2 and C2 of the frames A1, B1 and C1 in the pictures imaged consecutively of the objects that can be the sound sources are used to provide information as to locations thereof, use may be made of horizontal and vertical coordinates to provide information as to locations thereof.

Further, in the example mentioned above the image processing means 13 is designed to select or determine information as to the locations of the objects that can be the sound sources on the basis of the color and shape (e.g., height) of the objects in the pictures imaged consecutively.

Still further, while in the example mentioned above the image processing means 13 is designed to effect image processing with reference to the rough directions A0, B0 and C0 received from the sound processing means 14, the invention broadly is not limited thereto but may have information selected or determined as to the locations of the objects that can be the sound sources only on the basis of pictorial information received from the imaging means 12.

In order to detect the direction in which a sound source is located, an active element such as in the form of a badge carrying magnetism may be attached to the sound source to determine the direction in which the magnetism is emitted by using a magnetic sensing device as its detecting means. The direction detected by the magnetic sensing means may be fed back to the sound processing means and used by the latter to prepare a directional filter, thereby separating the sound source.

In case the sound source is a person, its emission of a heat ray renders an infrared detector usable to detect the direction in which the sound source is located.

As described in the foregoing, it is seen that the present invention according to which in identifying a sound source based on sound information the direction in which the sound source is located is narrowed based on information as to its image and information as to its located direction detected while with reference to information as to the location of an object that can be the sound source, makes it unnecessary to process the sound information omnidirectionally or over all the directions in identifying the sound source, makes it possible to identify the sound source with greater certainty, makes a lesser amount of processable information sufficient and makes it possible to reduce the time for processing. Accordingly, a highly advantageous sound source identifying apparatus and method are provided in accordance with the present invention, which make it possible to identify a plurality of sound sources with due accuracy by means of a pair of microphones.

Although the present invention has hereinbefore been set forth with respect to certain illustrative forms of embodiments thereof, it will readily be appreciated to be obvious to a person skilled in the art that many alternations thereof, omissions therefrom and additions thereto can be made without departing from the essences of scope of the present invention. Accordingly, it should be understood that the invention is not intended to be limited to the specific forms of embodiment thereof set forth below, but to include all possible forms of embodiment thereof that can be made within the scope with respect to the features specifically set forth in the appended claims and encompasses all the equivalents thereof.

INDUSTRIAL APPLICABILITY

As will be appreciated from the foregoing description, a sound source identifying apparatus and method according to the present invention are highly useful as a sound source identifying apparatus and method whereby the location of an object as a sound source is identified with due certainty based on both sound and image information and the use of its position information permits each of such sound sources to be separated from mixed sounds with due accuracy.

The invention claimed is:

1. A sound source identifying and separating apparatus, characterized in that it comprises:

a sound collecting means including a pair of sound collecting microphones juxtaposed with each other across a preselected spacing and opposed to a plurality of sound sources, said two microphones each individually capturing mixed sounds from said sound sources therewith;

an imaging means and/or a sensing means, said imaging means being adapted to consecutively image objects that can be said sound sources, said sensing means sensing directions in which said objects possibly being said sound sources are located;

a sound processing means for determining the directions of all said sound sources based on sound information for a difference between phases and a difference between intensities which each of said mixed sounds from said sound sources has when captured by said two sound collecting microphones, respectively;

an image processing means for determining the direction of each of said objects possibly being said sound sources, from information for image pictures imaged by said imaging means and/or directional information for each of said objects sensed by said sensing means;

directional filters; and a control means for controlling operations of said sound collecting means, said imaging means and/or said sensing means, said image processing means, and said sound processing means, wherein the operations of said sound collecting means, said imaging means and/or said sensing means, said image processing means, and said sound processing means, are so controlled by said control means that:

said sound processing means predetermines rough directions of said sound sources from information for said sounds captured by said sound collecting means, and said image processing means determines the direction of each of said objects possibly being said sound sources within a range defined by said predetermined rough directions; or said image processing means predetermines directions of said sound sources only from information for image pictures imaged by said imaging means and/or directional information for each of said objects sensed by said sensing means, and said sound processing means determines the directions of said sound sources within a range of angles defined by said predetermined directions; or said sound processing means predetermines rough directions of said sound sources only from information for said sounds captured by said sound collecting means, and said sound processing means selects said directional filters corresponding to said predetermined directions of said sound sources, whereby it is made possible to identify the directions of all said sound sources and to separate them from one another even if neighboring ones of them lie close by.

2. A sound source identifying and separating apparatus as set forth in claim 1, characterized in that said sensing means is adapted to sense said objects possibly being said sound sources in response to magnetism thereof.

3. A sound source identifying and separating apparatus as set forth in claim 1 or claim 2, characterized in that said objects possibly being said sound sources have each a magnetic carrying material attached thereto.

4. A sound source identifying and separating apparatus as set forth in claim 1, characterized in that said sensing means is adapted to sense said objects possibly being said sound sources in response to infrared rays that they emit.

5. A sound source identifying and separating apparatus as set forth in any one of claim 1 to claim 4, characterized in that said image processing means has a function to determine direction of all said objects possibly being said sound sources on the basis of a color of a said object.

6. A sound source identifying and separating apparatus as set forth in any one of claim 1 to claim 4, characterized in that said image processing means has a function to determine directions of all said objects possibly being said sound sources on the basis of a shape of a said object.

7. A sound source identifying and separating apparatus as set forth in any one of claim 1 to claim 4, characterized in that said image processing means has a function to determine direction of all said objects possibly being said sound sources on the basis of a color, a shape and a height together of a said object.

8. A sound source identifying and separating method, characterized in that it comprises:

a first step of capturing mixed sounds from a plurality of sound sources with a pair of sound collecting microphones juxtaposed with each other across a preselected spacing and opposed to the sound sources, said two sound collecting microphones each individually capturing said mixed sounds from said sound sources;

conducted concurrently with the first step, a second step in which an imaging means consecutively images objects that can be said sound sources to produce image pictures thereof and/or a sensing means senses directions in which said objects are located;

a third step in which a sound processing means determines a rough direction of each of all said sound sources from sound information for said mixed sounds captured in the first step and on the basis of information in said sound information for a difference between phases and a difference between intensities;

a fourth step in which an image processing means determines a direction of each of said objects possibly being all said sound sources from information for the image pictures produced and/or information for the direction sensed in the second step, within a range defined by such rough directions determined in the third step;

a fifth step in which said sound processing means determines a direction of each of all said sound sources on the basis of said sound information for a difference between phases and a difference between intensities, within a range of angles defined by such directions determined in the fourth step;

a sixth step in which said sound processing means selects a particular directional filters in accordance with the direction determined in the fifth step of each of all said sound sources to separate all said sound sources from one another;

a seventh step in which said image processing means determines a direction of each of all said objects possibly being said sound sources on the basis of information for the image pictures produced and/or information for the direction sensed by said sensing means in the second step, and said sound processing means determines a direction of each of all said sound sources on the basis of said sound information for a difference between phases and a difference between intensities as aforesaid within a range of angles defined by thus determined directions, and selects' a particular directional filter in accordance with the thus determined direction of each of all said source to separate all said sound sources from one another; and an eight step in which said sound processing means selects such particular filters in accordance with such rough directions determined in the third step to separate all said sound sources from one another.

9. A sound source identifying and separating method as set forth in claim 8, characterized in that the direction sensing by said sensing means is effected in response to an infrared ray.

10. A sound source identifying and separating method as set forth in claim 8 characterized in that the direction sensing by said sensing means is effected in response to magnetism.

11. A sound source identifying and separating method as set forth in claim 8, characterized in that the direction of each of all said objects possibly being said sound sources is determined by said image processing means on the basis of a color thereof.

12. A sound source identifying and separating method as set forth in claim 8, characterized in that the direction of each of all said objects possibly being said sound sources is determined by said image processing means on the basis of a shape thereof.

13. A sound source identifying and separating method as set forth in claim 8, characterized in that the direction of each of all said objects possibly being said sound sources is determined by said image processing means on the basis of a color, a shape and a height thereof.

14. A sound source identifying method as set forth in claim 8, characterized in that determination of the direction of each of all said sound sources by said sound processing means on the basis of sound information for a difference between phases and a difference between intensities is effected by determining a position of each of said sources on the basis of a signal for each of frequency bands arbitrarily divided into.

15. A sound source identifying method as set forth in claim 8, characterized in that said position information of a said object possibly being a said sound source is derived from a movement of said object.

* * * * *